(12) United States Patent
Heim et al.

(10) Patent No.: US 12,422,880 B2
(45) Date of Patent: Sep. 23, 2025

(54) BLOCKING UNIT, ELECTROMECHANICAL UNIT, AND AIRCRAFT

(71) Applicant: Liebherr-Aerospace Lindenberg GmbH, Lindenberg (DE)

(72) Inventors: Patrick Heim, Lindenberg (DE); Paul Forschner, Bregenz (AT); Anton Gaile, Leutkirch (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 107 days.

(21) Appl. No.: 18/499,008

(22) Filed: Oct. 31, 2023

(65) Prior Publication Data

US 2024/0176381 A1    May 30, 2024

(30) Foreign Application Priority Data

Nov. 30, 2022   (DE) ..................... 10 2022 131 677.7

(51) Int. Cl.
   *G05G 5/00*    (2006.01)
(52) U.S. Cl.
   CPC .................... *G05G 5/005* (2013.01)
(58) Field of Classification Search
   CPC ..................................................... G05G 5/005
   See application file for complete search history.

(56) References Cited

U.S. PATENT DOCUMENTS

| | | | | |
|---|---|---|---|---|
| 4,762,205 A | * | 8/1988 | Ortman | F16D 59/00 188/82.5 |
| 7,347,115 B2 | * | 3/2008 | Otaki | F16D 65/28 74/89.37 |
| 9,038,944 B2 | | 5/2015 | Senegas et al. | |
| 2013/0334372 A1 | * | 12/2013 | Marques | B64D 45/00 244/76 R |
| 2014/0326828 A1 | * | 11/2014 | Senegas | F16H 35/00 244/99.3 |

FOREIGN PATENT DOCUMENTS

| | | |
|---|---|---|
| DE | 102012000987 A1 | 7/2013 |
| FR | 2956647 A1 | 8/2011 |
| FR | 2988797 A1 | 10/2013 |
| FR | 3017600 A1 | 8/2015 |
| WO | 2019174024 A1 | 9/2019 |

\* cited by examiner

*Primary Examiner* — Tye William Abell
(74) *Attorney, Agent, or Firm* — McCoy Russell LLP

(57) ABSTRACT

The present disclosure relates to a blocking unit for a component of an aircraft movable by at least one movement means, wherein the component can assume at least one blocking position and at least one movement position, wherein the blocking unit comprises blocking means, wherein the blocking means are arranged and designed to block a movement of the component when a blocking condition is fulfilled, wherein the blocking unit has locking means, wherein the locking means are arranged and designed such that the blocking means are prevented from blocking the movement of the component when the component is in a movement position, and wherein the locking means are arranged and designed such that the blocking means are not prevented from blocking the movement of the component when the component is in a blocking position.

14 Claims, 2 Drawing Sheets

BLOCKING UNIT, ELECTROMECHANICAL UNIT, AND AIRCRAFT

CROSS REFERENCE TO RELATED APPLICATION

The present application claims priority to German Patent Application No. 10 2022 131 677.7 filed on Nov. 30, 2022. The entire contents of the above-listed application are hereby incorporated by reference for all purposes.

TECHNICAL FIELD

The present disclosure relates to a blocking unit for a component of an aircraft movable by at least one movement means, wherein the component can assume at least one blocking position and at least one movement position, wherein the blocking unit comprises blocking means, wherein the blocking means are arranged and designed to block a movement of the component when a blocking condition is fulfilled.

SUMMARY

In aircraft known from the prior art, a large number of consumers are supplied hydraulically or these aircraft have units that can convert electrical energy into hydraulic pressure.

Hydraulic actuators usually have two chambers. These two chambers of such hydraulic actuators can be connected to each other for example by overpressure valves or throttles and thus certain functions can be ensured even without a signal or hydraulic supply.

For example an air brake can counteract different forces in the extension and retraction direction by means of different precisely adjustable pressure relief valves and can give way above a certain force. This is especially necessary for air brakes that follow the high-lift flaps in order to reduce the contact force between air brake and high-lift flap if the hydraulic or signal supply is no longer guaranteed.

Another example concerns the actuation of, for example, an aileron, which is hydraulically damped in the event of loss of hydraulic or signal supply, thus preventing it from swinging up or remaining in a control deflection.

With increasing electrification of aircraft, electromechanical drive units offer many advantages. However, a major disadvantage is that mechanical overload clutches, brakes or dampers have a significantly higher complexity and can be adjusted less precisely due to, for example, wear or efficiency changes.

Current implementations of mechanical overload clutches, brakes or dampers in electromechanical units currently only have one operating state when either signal and/or power supply are no longer available.

For example, electric drives of high-lift systems usually have an integrated brake that, without signal or power supply, fixes the system, independently of the load direction and current position. When used in air brakes or, for example, in ailerons, this would possibly lead to increased drag or, if the air brakes follow the high-lift system, would cause the high-lift system to no longer be able to be retracted.

Another example is constituted by electromechanical drive units in air brakes of modern commercial aircraft, which are not fixed in the event of a fault and remain in the so-called zero-hinge position, wherein negative pressure loads on the upper wing surface and wind loads balance each other out in this position. However, this leads to reduced lift and increased fuel consumption.

If the control flaps are fixed in one or both load directions and are to give way above a certain load, a load limitation is necessary depending on the field of application. This may require different trigger points in the pull and push directions and is activated or deactivated via an electrically operated mechanism. Directionality can be achieved, for example, via a ratchet mechanism or a so-called skewed roller. Activation is possible, for example, via a brake or a clutch and the overload function can be unset, for example, via a spring-loaded ball ramp or a mechanical slip clutch, etc.

These solutions have a significant disadvantage in terms of, for example, weight, installation space, costs and/or complexity. Other aspects are the variance of the release forces and their influence on performance, efficiency and design forces of the electromechanical unit as well as the authority of the control surface.

Against this background, the present disclosure is based on the object of improving an above-mentioned blocking unit, in particular for use in an electromechanical unit, compared to the prior art.

This object is achieved by the subject matter having the features as described herein.

Accordingly, it is provided in accordance with the disclosure that the blocking unit has locking means, wherein the locking means are arranged and designed such that the blocking means are prevented from blocking the movement of the component when the component is in a movement position, and wherein the locking means are arranged and designed such that the blocking means are not prevented from blocking the movement of the component when the component is in a blocking position.

The movement position and/or the blocking position can also be parts of a movement range or blocking range. The ranges can also be interrupted so that there can be several movement ranges and/or blocking ranges.

Thus, for example, a flap can be moved into a blocking position by aerodynamic forces and can be blocked only there. This prevents the flap from generating unnecessary drag, for example.

Preferably, it is provided that the component can be moved linearly and/or rotationally.

In an advantageous embodiment, it is provided that the locking means are mechanically connected to the component, preferably via a lever mechanism.

Preferably, the locking means are designed such that the locking means do not require a power and/or signal supply to be able to prevent the blocking means from blocking the movement of the component when the component is in a movement position.

It is conceivable that the blocking condition is a failure of the power and/or signal supply for at least one movement means of the component.

It is conceivable that the blocking means are designed and arranged in such a way that they can block the movement of the component by means of frictional engagement and/or form fit.

Preferably, it is provided that the blocking means are designed and arranged in such a way that a force limitation of a force acting on the component takes place.

It is preferably provided that the blocking means are designed and arranged in such a way that a movement of the component can only be blocked in one, two or more directions.

In an advantageous embodiment, it is provided that the blocking means comprise brake stator discs and the locking means comprise a locking element, preferably in the form of a fork, wherein the brake stator discs and the locking element are designed and arranged in such a way that the locking element is at least partially arranged between the brake stator discs when the component is in a movement position and the locking element is not arranged between the brake stator discs when the component is in a blocking position.

It is conceivable that the blocking unit is designed and arranged in such a way that a movement of the component from a movement position takes place preferably by friction and/or fluid movement and/or electrically, in a damped or undamped manner.

It is preferably provided that the blocking means is designed and arranged in such a way that when a blocking of the component has occurred, the blocking can only be cancelled by a method comprising the step of sending a signal, preferably electrical, to the blocking means.

In other words, the blocking means can comprise a controller which is designed in such a way that blocking can be cancelled by the blocking means by a signal, preferably electrical.

In an advantageous embodiment, it is provided that the component is or comprises a part of a motor, an electromechanical unit, an air brake, a component of a primary or secondary flight control system, a flap actuation system and/or a landing gear actuation system.

The disclosure also relates to an electromechanical unit comprising a blocking unit according to the disclosure.

The disclosure also relates to an aircraft, in particular an aircraft comprising a blocking unit according to the disclosure.

The blocking unit in, for example, an electromechanical unit is preferably fixed in a certain, safe blocking range and counteracts external loads if, for example, signal and/or power supply are no longer available. This can preferably be made possible independently of the current position of the electromechanical unit.

Preferably, a component actuated by the electromechanical unit can be fixed in one or more safe blocking positions by the electromechanical unit in a fault case (for example loss of power and/or signal supply). Outside these blocking positions, the component is preferably freely movable and can preferably move undamped or damped by external loads. Damping can be done electronically by operating the motor of the electromechanical unit in generator mode and recovering or dissipating energy. Another type of damping can be, for example, a friction element or can be effected via fluid movement. The fixing preferably requires neither a signal nor a power supply.

Preferably, the blocking is activated by a mechanism that is only activated in a certain movement range or stroke range of the component. Therefore, the blocking unit preferably does not need a load limitation.

It is preferably provided that the blocking unit can be part of an electromechanical unit, wherein the blocking unit can be active only in one or more stroke or movement ranges and/or can be used in an electromechanical unit with a rotary or linear actuating element and/or a mechanical coupling between the blocking unit and the component can be present, and/or wherein the blocking unit can be active without power or signal supply and/or, once the blocking unit is activated, an electrical activation can be required for the reset and/or the blocking unit can be activated automatically by positioning the component in the defined blocking range (s), and/or wherein the blocking unit can block by frictional engagement or a form fit, and/or wherein a force limitation can also be included in the blocking unit when using frictional engagement, and/or wherein the blocking unit can act in both directions.

Preferably, the electromechanical unit can comprise a stationary structure and an actuating element which is movable relative to the stationary structure, or rather a component, wherein the electromechanical unit can comprise blocking means to lock the actuating element in its position, wherein the blocking means can be attached to the stationary structure and can have a state to lock and a state to release the actuating element, wherein the blocking means may or may not have a voltage limiter, and can comprise at least one blocking element with form fit or frictional engagement, arranged such that a lever mechanism rests on a surface of the actuating element to resist movement of the actuating element in a defined or undefined direction, so that an actuator can comprise an element for controlling the blocking means into a releasing state and an element for returning the blocking means into a locking state. In addition, the blocking means can comprise a further control element or locking element which can restrict the effective range of the locking state or the releasing state.

It should be noted at this juncture that the terms "one" and "a" do not necessarily refer to exactly one of the elements, although this is a possible embodiment, but can also denote a plurality of the elements. Similarly, the use of the plural also includes the presence of the element in question in the singular and, conversely, the singular also includes a plurality of the elements in question. Furthermore, all of the features of the disclosure described herein can be claimed in any combination with each other or in isolation from each other.

BRIEF DESCRIPTION OF THE FIGURES

Further advantages, features and effects of the present disclosure will become apparent from the following description of preferred exemplary embodiments with reference to the figures, in which the same or similar components are denoted by the same reference signs. In the figures.

DETAILED DESCRIPTION

Figure 1:
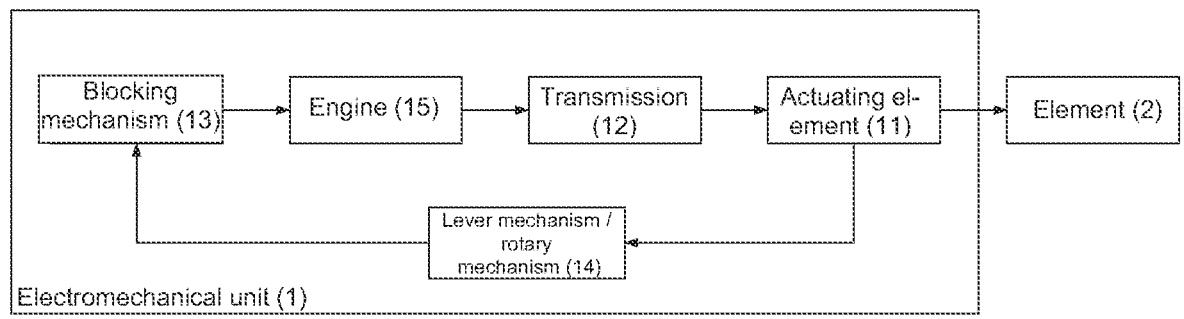
FIG. 1: shows a block diagram of an embodiment of an electromechanical unit according to the disclosure.

FIG. 1 shows a diagram of an electromechanical unit 1. This has either a rotary or a linear actuating element 11. The unit 1 is driven by an electric motor 15 and can have a transmission 12. The unit 1 can be fixed by blocking means, such as a blocking mechanism 13, for example a brake.

The blocking mechanism 13 can be located anywhere in the electromechanical unit 1 and can act by frictional engagement or form fit. The blocking mechanism 13 can act in one or both directions.

The actuating element 11 actuates not only the element 2 but also a lever mechanism and/or rotary mechanism 14 once the actuating element 11 is in a safe position.

A component preferably comprises the actuating element 11 and the element 2.

Figure 2:
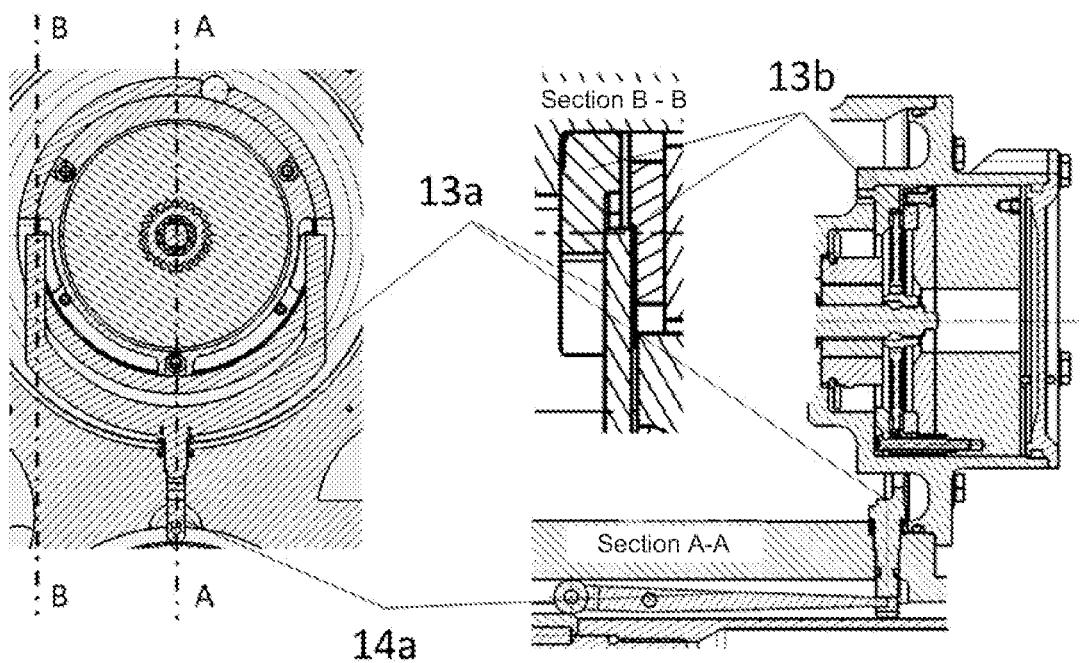
FIG. 2: shows sectional views of an embodiment of an electromechanical unit according to the disclosure in a first position.

The lever mechanism and/or rotary mechanism 14 deflects a locking element 13a within the blocking mechanism 13 from its rest position, as shown in FIG. 2.

In FIG. 2, blocking means in the form of brake stators 13b and a locking element 13a are shown. The locking element 13a is connected to an actuating element via a lever 14a.

In FIG. 2 the actuating element 11 is in a blocking position. Therefore, the locking element 13a is not arranged between the brake stators 13b.

Figure 3:
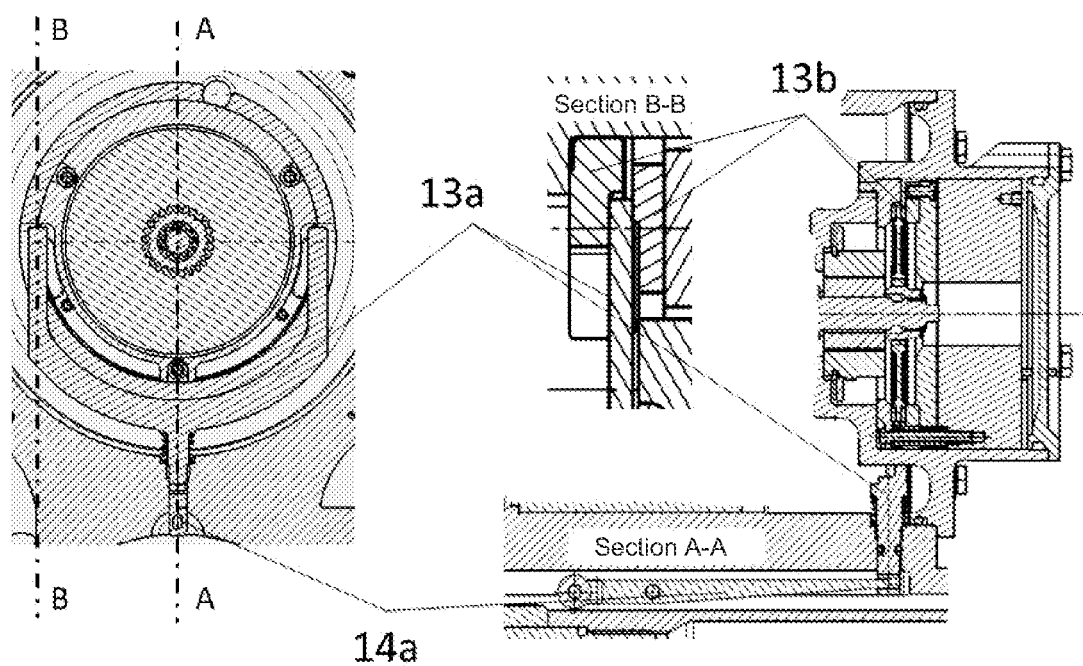
FIG. 3: shows sectional views of an embodiment of an electromechanical unit according to the disclosure in a second position.

In FIG. 3 the actuating element 11 is in a movement position. Therefore, the locking element 13a is arranged between the brake stators 13b.

If the element 2 is outside a safe blocking range, i.e. in a movement position, when the loss of power and/or signal supply occurs, the locking element 13a prevents the activation of the blocking mechanism 13 until the element reaches the safe blocking range.

If the element 2 is within the safe blocking range when the loss of power and/or signal supply occurs, the blocking mechanism 13 is directly active.

An example of the possible implementation is the application for the actuation of an air brake which follows the high-lift system. In this application, the lower limit of the safe blocking range can be considered to be the position when contact between the high-lift system and the air brake is ruled out, and the upper limit when, in flight, the wind load and negative pressure on the air brake are balanced and the external loads are zero.

The blocking mechanism 13 can be a brake to be opened by a magnet, which brake is closed without supply voltage and brakes the motor 15. The locking element 13a can be a spacer which has its rest position between the brake stators 13b and prevents the brake from closing outside the safe blocking range. The lever mechanism and/or rotary mechanism 14 can be a lever 14a which pulls the locking element 13a out of the rest position in the safe range.

It is preferably made possible to fix components, primarily on aircraft, in one or more specific blocking ranges, while in the other movement positions the components can be moved by external forces. Especially, but not only, in
  air brakes
  primary flight control systems
  secondary flight control systems
  flap actuation systems
  landing gear actuation systems
  this concept allows the number of components, as well as weight, installation space and complexity to be reduced.

FIGS. 2-3 are drawn to scale, although other relative proportions and/or positioning may be used, if desired.

FIGS. 2-3 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A blocking unit for a component of an aircraft movable by at least one movement means, wherein the component can assume at least one blocking position and at least one movement position, wherein the blocking unit comprises blocking means, wherein the blocking means are arranged and designed to block a movement of the component when a blocking condition is fulfilled, wherein the blocking unit has locking means, wherein the locking means are arranged and designed such that the blocking means are prevented from blocking the movement of the component when the component is in a movement position, and wherein the locking means are arranged and designed such that the blocking means are not prevented from blocking the movement of the component when the component is in a blocking position, and wherein the blocking means is configured to block the movement of the component in two or more directions.

2. The blocking unit according to claim 1, wherein the component can be moved linearly and/or rotationally.

3. The blocking unit according to claim 1, wherein the locking means are mechanically connected to the component via a lever mechanism.

4. The blocking unit according to claim 1, wherein the locking means are designed such that the locking means do not require a power and/or signal supply to be able to prevent the blocking means from blocking the movement of the component when the component is in a movement position.

5. The blocking unit according to claim 1, wherein the blocking condition is a failure of the power and/or signal supply for at least one movement means of the component.

6. The blocking unit according to claim 1, wherein the blocking means are designed and arranged in such a way that they can block the movement of the component by means of frictional engagement.

7. The blocking unit according to claim 1, wherein the blocking means are designed and arranged in such a way that a force limitation of a force acting on the component takes place.

8. The blocking unit according to claim 1, wherein the blocking means is configured to block the component by form fit.

9. The blocking unit according to claim 1, wherein the blocking means comprise brake stator discs and the locking means comprise a locking element, in the form of a fork, wherein the brake shoes and the locking element are designed and arranged in such a way that the locking element is at least partially arranged between the brake stator discs when the component is in a movement position and the locking element is not arranged between the brake shoes when the component is in a blocking position.

10. The blocking unit according claim 1, wherein the blocking unit is designed and arranged in such a way that a movement of the component from a movement position takes place by friction and/or fluid movement and/or electrically, in a damped or undamped manner.

11. The blocking unit according to claim 1, wherein the blocking means is configured to stop blocking in response to receiving an electrical signal from an electromechanical unit.

12. The blocking unit according to claim 1, wherein the component is or comprises a part of an engine, an electromechanical unit, an air brake, a component of a primary or secondary flight control system, a flap actuation system and/or a landing gear actuation system.

13. An electromechanical unit comprising a blocking unit according to claim 1, wherein the electromechanical unit further comprises a stationary structure and the component, wherein the component is movable relative to the stationary structure.

14. An aircraft comprising a blocking unit according to claim 1.

* * * * *